United States Patent Office 3,812,050
Patented May 21, 1974

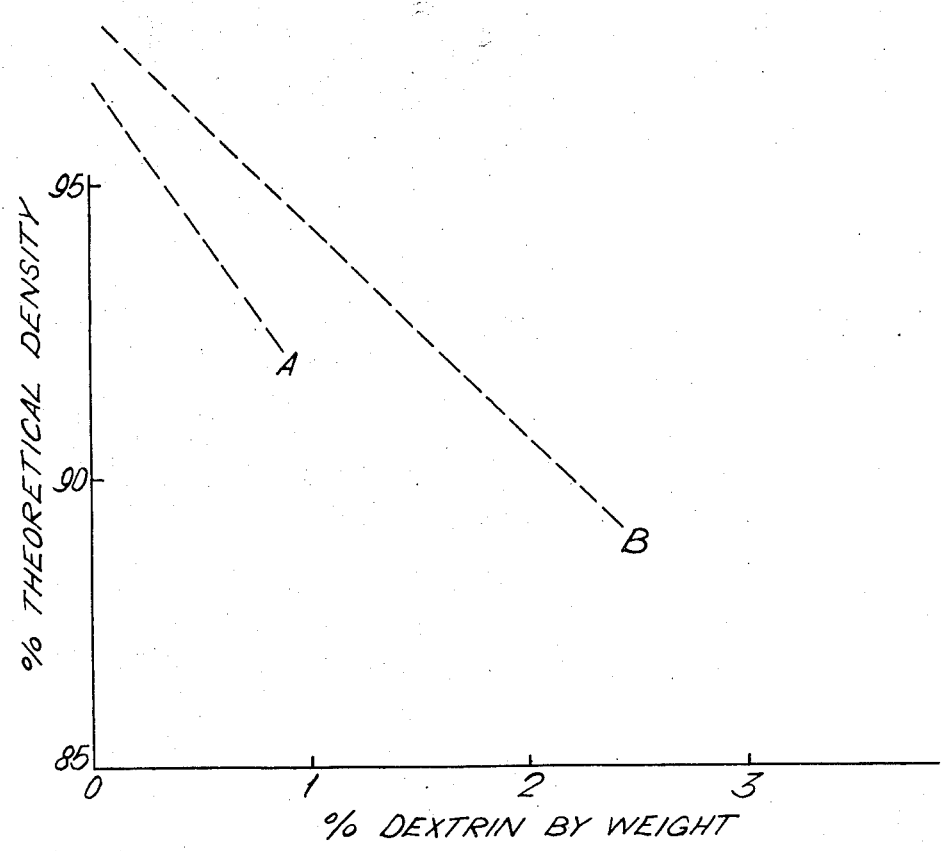

---

3,812,050
PRODUCTION OF POROUS CERAMIC NUCLEAR FUEL EMPLOYING DEXTRIN AS A VOLATILE PORE FORMER
Bernard Robert Steele, Watford, England, assignor to United Kingdom Atomic Energy Authority, London, England
Filed Jan. 12, 1973, Ser. No. 323,229
Claims priority, application Great Britain, Jan. 13, 1972, 1,586/72
Int. Cl. C01g 43/02
U.S. Cl. 252—301.1 R                    2 Claims

ABSTRACT OF THE DISCLOSURE

To produce low density sintered uranium dioxide fuel pellets uranium dioxide powder is mixed with dextrin which is removed during subsequent sintering of pellets formed from the mixture.

---

BACKGROUND OF THE INVENTION

This invention relates to ceramic nuclear fuel.

Requirements sometimes arise for low density sintered nuclear fuel pellets formed from uranium dioxide powder, typically pellets of density within the range 9.9–10.4 g./cc. compared with the more usual densities of 10.60–10.75 g./cc. These can be produced by increasing the crystallite size of the uranium dioxide powder by calcining at a higher temperature than usual. Alternatively they can be produced from standard uranium dioxide powder by addition of a filler which decomposes so that it can be removed either during sintering or a special pretreatment.

SUMMARY OF THE INVENTION

According to the present invention dextrin is incorporated as a filler in pellets of uranium dioxide powder. The pellets are subsequently sintered to remove the dextrin which "burns out" leaving a hole or pore so that the product is of relatively low density.

EXAMPLES OF THE INVENTION

The following is an example of one way of carrying the invention into effect.

Dextrin having a maximum particle size of 30 microns is added to uranium dioxide powder in a ball mill and the powder comminuted. The milled powder is mixed with a binder, granulated through a sieve and oven-dried. The dried granules are classified and the oversize granules pressed into green pellets at a density in the range 5.8–6.6 g./cc. The pellets are then debonded in carbon dioxide at a temperature above 800° C. and sintered in hydrogen above 1600° C.

In an alternative process the dextrin is added to the uranium dioxide powder after ball-milling.

The amount of dextrin required to obtain a given density in a sintered uranium dioxide pellet may be determined by experiment as follows:

(a) Using 500 g. quantities of uranium dioxide powder, ball-milled or micronized as appropriate, produce blends containing 0.0, 0.5, 1.0, 1.5 and 2.0% dextrin by dry powder blending in suitable equipment or by thorough hand mixing in a bowl.

(b) With each blend, produce granules by the addition of a binder.

(c) Form into pellets by compacting the granules at 10, 15, 20, 25 and 30 tons/sq. in. and measure their green densities.

(d) Debond in carbon dioxide using a temperature profile which avoids cracking.

(e) Sinter the debonded pellets in hydrogen using any convenient profile and peak temperature.

(f) After measurement of the sintered densities, construct graphs showing the variation of green and sintered densities with compacting pressure at fixed dextrin concentrations, and the variation of sintered density with dextrin concentration at fixed compacting pressures.

A mixture may now be made on a large scale, using a Y-cone blender or other suitable dry blending equipment, and processed using the above conditions to produce the required sintered density.

In the accompanying graph is shown the effect of increasing weight of filler on the density of sintered pellets. Curves A and B indicate results obtained with different forms of dextrin, respectively hollow and solid particles.

By way of an example, it was decided to produce pellets of density 10.4 and 10.2 g./cc. from micronized powder which normally sinters to 10.75 g./cc. The preliminary tests were carried out on 500 g. quantities of material. From the results, the amounts of dextrin necessary to produce the required densities were found; there were 0.8 and 1.2% dextrin respectively. Blends were then produced on the 10 kg. scale in a Y-cone blender and, after processing, the pellets sintered to the required densities with a standard deviation of 0.028 in the case of the 10.4 g./cc. pellets and 0.007 in the case of the 10.2 g./cc. pellets.

I claim:

1. Pellets of uranium dioxide powder incorporating dextrin as a filler.

2. A method of producing nuclear fuel pellets including the steps of mixing uranium dioxide powder with dextrin powder, forming the mixture into pellets and sintering the pellets.

References Cited

UNITED STATES PATENTS

| | | | |
|---|---|---|---|
| 3,641,227 | 2/1972 | Horsley et al. | 252—301.1 R |
| 3,131,239 | 4/1964 | Calis et al. | 75—222 X |
| 3,320,179 | 5/1967 | Gens | 252—301.1 S |

BENJAMIN R. PADGETT, Primary Examiner

R. L. TATE, Assistant Examiner

U.S. Cl. X.R.
75—222; 264—.5; 423—261